US011095982B2

(12) United States Patent
Min (10) Patent No.: US 11,095,982 B2
(45) Date of Patent: Aug. 17, 2021

(54) SPEAKER APPARATUS, ELECTRONIC APPARATUS CONNECTED THEREWITH, AND CONTROLLING METHOD THEREOF (71) Applicant: SAMSUNG ELECTRONICS CO., LTD., Suwon-si (KR)

(72) Inventor: Kyoung Bo Min, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 54 days.

(21) Appl. No.: 16/266,553

(22) Filed: Feb. 4, 2019

(65) Prior Publication Data
US 2019/0174230 A1 Jun. 6, 2019

Related U.S. Application Data (63) Continuation of application No. 15/799,409, filed on Oct. 31, 2017, now Pat. No. 10,237,653.

(30) Foreign Application Priority Data

Nov. 7, 2016 (KR) .................. 10-2016-0147464

(51) Int. Cl.
H04R 3/12 (2006.01)
H04R 27/00 (2006.01)
(Continued)

(52) U.S. Cl.
CPC ............ H04R 3/12 (2013.01); G06F 3/165 (2013.01); H04R 5/04 (2013.01); H04R 27/00 (2013.01);
(Continued)

(58) Field of Classification Search
CPC ............ H04R 27/00; H04R 2227/003; H04R 2420/01; H04R 2420/07; H04R 15/04; H04R 2227/005; H04R 3/12
(Continued)

(56) References Cited

U.S. PATENT DOCUMENTS 8,054,987 B2 11/2011 Seydoux
8,155,335 B2 4/2012 Rutschman
(Continued)

FOREIGN PATENT DOCUMENTS

CN 105072564 A 11/2015
EP 2 355 563 A1 8/2011
(Continued)

OTHER PUBLICATIONS

Communication dated Feb. 1, 2018, issued by the International Searching Authority in counterpart International Patent Application No. PCT/KR2017/011792 (PCT/ISA210, PCT/ISA/237).
(Continued)

Primary Examiner — Disler Paul
(74) Attorney, Agent, or Firm — Sughrue Mion, PLLC (57) ABSTRACT A speaker apparatus includes a first wireless communicator connected with a first source apparatus to receive a first audio signal from the first source apparatus or connected with an external speaker apparatus to transmit the first audio signal to the external speaker apparatus; a second wireless communicator configured to be connected with a second source apparatus to receive a second audio signal from the second source apparatus; and a controller configured to control the first wireless communicator and the second wireless communicator. The controller controls the first wireless communicator to switch from a reception mode to a transmission mode to transmit the second audio signal to the external speaker apparatus in response to the second wireless communicator being connected with the second source apparatus.

8 Claims, 6 Drawing Sheets (51) Int. Cl.
*H04W 4/80* (2018.01)
*G06F 3/16* (2006.01)
*H04R 5/04* (2006.01)

(52) U.S. Cl.
CPC ......... *H04W 4/80* (2018.02); *H04R 2227/003* (2013.01); *H04R 2420/01* (2013.01); *H04R 2420/07* (2013.01)

(58) Field of Classification Search
USPC ........................................ 381/80–81, 77, 79
See application file for complete search history.

(56) References Cited

U.S. PATENT DOCUMENTS

| | | |
|---|---|---|
| 8,190,797 B2 | 5/2012 | Barbe et al. |
| 8,325,935 B2 | 12/2012 | Rutschman |
| 8,457,334 B2 | 6/2013 | Yoon et al. |
| 8,705,780 B2 | 4/2014 | Yoon et al. |
| 8,971,546 B2 | 3/2015 | Millington et al. |
| 9,002,044 B2 | 4/2015 | Dinescu et al. |
| 9,137,602 B2 * | 9/2015 | Mayman .................. H04R 3/12 |
| 9,191,699 B2 | 11/2015 | Agerbak et al. |
| 9,247,492 B2 | 1/2016 | Millington et al. |
| 9,544,689 B2 | 1/2017 | Fisher et al. |
| 9,681,232 B2 | 6/2017 | Millington et al. |
| 9,729,640 B2 | 8/2017 | Agerbak et al. |
| 2007/0160225 A1 | 7/2007 | Seydoux |
| 2008/0226094 A1 | 9/2008 | Rutschman |
| 2009/0268923 A1 * | 10/2009 | Li .......................... H04N 5/775 381/77 |
| 2010/0325323 A1 | 12/2010 | Barbe et al. |
| 2011/0150228 A1 | 6/2011 | Yoon et al. |
| 2012/0155670 A1 | 6/2012 | Rutschman |
| 2012/0230510 A1 | 9/2012 | Dinescu et al. |
| 2013/0094667 A1 | 4/2013 | Millington et al. |
| 2013/0170363 A1 | 7/2013 | Millington et al. |
| 2013/0173794 A1 | 7/2013 | Agerbak et al. |
| 2013/0251178 A1 | 9/2013 | Yoon et al. |
| 2013/0343569 A1 * | 12/2013 | Mayman ................ H04R 27/00 381/81 |
| 2015/0098583 A1 | 4/2015 | Millington et al. |
| 2015/0326670 A1 | 11/2015 | Agerbak et al. |
| 2016/0014513 A1 | 1/2016 | McCoy |
| 2016/0066093 A1 | 3/2016 | Fisher et al. |
| 2016/0073200 A1 * | 3/2016 | Yoo .......................... H04R 1/10 381/311 |
| 2016/0088039 A1 | 3/2016 | Millington et al. |
| 2017/0083284 A1 | 3/2017 | Fisher et al. |
| 2017/0093510 A1 | 3/2017 | Lin |
| 2017/0223472 A1 | 8/2017 | Millington et al. |
| 2018/0088897 A1 * | 3/2018 | Mathur .................... H04R 3/00 |
| 2019/0069066 A1 * | 2/2019 | Song .................... H04R 1/1041 |
| 2020/0084532 A1 * | 3/2020 | Lo ........................... H02J 7/342 |

FOREIGN PATENT DOCUMENTS

| | | |
|---|---|---|
| EP | 3 148 225 A1 | 3/2017 |
| JP | 2009-181182 A | 8/2009 |
| JP | 2011-71672 A | 4/2011 |
| JP | 2013-504937 A | 2/2013 |
| JP | 2015-176408 A | 10/2015 |
| KR | 10-0730003 B1 | 6/2007 |
| KR | 10-2010-0015531 A | 2/2010 |
| KR | 10-2011-0072650 A | 6/2011 |
| KR | 10-2011-0121675 A | 11/2011 |
| KR | 10-2013-0141039 A | 12/2013 |
| WO | 2007/074245 A2 | 7/2007 |

OTHER PUBLICATIONS

Communication dated Feb. 27, 2018, issued by the European Patent Office in counterpart European application No. 17198395.0.
Communication dated Jun. 30, 2020, from the Japanese Patent Office in Application No. 2019-523803.
Communication dated Mar. 30, 2021, from the Japanese Patent Office in Application No. 2019-523803.
Nicolas-Alexander Tatlas et al., "WLAN Technologies for Audio Delivery", Hindawi Publishing Corporation, Dec. 27, 2007, vol. 2007, pp. 1-16 (17 pages total).
"The pairing work for connecting Bluetooth devices each other is performed using NFC", Digiland, 2015, Article Retrieved from: <https://web.archive.Org/web/20151231222528/https://info.shimamjra.co.jp/digital/knowledge/2015/10/69 258> pp. 1-6 (6 pages total).

* cited by examiner

SPEAKER APPARATUS, ELECTRONIC APPARATUS CONNECTED THEREWITH, AND CONTROLLING METHOD THEREOF

CROSS-REFERENCE TO RELATED APPLICATIONS

This application is a continuation of U.S. patent application Ser. No. 15/799,409, filed on Oct. 31, 2017 which claims priority from 35 U.S.C. § 119(a) of a Korean Patent Application 10-2016-0147464, filed on Nov. 7, 2016 in the Korean Intellectual Property Office, the entire disclosures of which are hereby incorporated by reference.

TECHNICAL FIELD

Apparatuses and methods consistent with exemplary embodiments relate to a speaker apparatus controlling a wireless communication module for the purpose of receiving an audio signal according to a change in a source apparatus and a controlling method of the speaker apparatus.

BACKGROUND

Nowadays, a demand on a separate speaker system for improving insufficient sound quality and volume is increasing as a slim design becomes popular together with a high-definition screen of a digital television (TV).

In the speaker system, an electronic apparatus (i.e., a source apparatus) and a speaker apparatus may be connected in wireless communication. When the electronic apparatus reproduces a data file, an audio signal included in the data file is transmitted to the speaker apparatus wirelessly connected to the electronic apparatus.

Also, in the speaker system, various channel manners may exist depending on user purposes, for example, listening to music or watching movies. A multi-channel speaker system may include a plurality of speakers and may receive and output an audio signal from the electronic apparatus.

SUMMARY

A speaker apparatus according to exemplary embodiments may be wirelessly connected with a source apparatus and may receive and output an audio signal from the source apparatus. In the case where a source apparatus wirelessly connected to the speaker apparatus is switched, the speaker apparatus may change settings in accordance with a source apparatus.

In the case where there is a need to change a transmission/reception state of a wireless communication module of the speaker apparatus depending on a connection condition of the source apparatus, a user may change the transmission/reception state of the wireless communication module.

Various exemplary embodiments of the present disclosure provide a speaker apparatus in which a transmission/reception state of the speaker apparatus is changed in accordance with a source apparatus when the source apparatus connected to the speaker apparatus is switched and a controlling method of the speaker apparatus.

In accordance with an aspect of another exemplary embodiment, there is provided a speaker apparatus including: a first wireless communicator configured to be connected with a first source apparatus to receive a first audio signal from the first source apparatus or connected with an external speaker apparatus to transmit the first audio signal to the external speaker apparatus; a second wireless communicator configured to be connected with a second source apparatus to receive a second audio signal from the second source apparatus; and a controller configured to control the first wireless communicator and the second wireless communicator. In response to the second wireless communicator being connected with the second source apparatus, the controller is configured to control the first wireless communicator to switch from a reception mode to receive the first audio signal from the first source apparatus to a transmission mode to transmit the second audio signal to the external speaker apparatus.

In accordance with an aspect of another exemplary embodiment, there is provided a method of controlling a speaker apparatus including: connecting with a first source apparatus through a first wireless communicator; receiving a first audio signal from the first source apparatus through the first wireless communicator; connecting with a second source apparatus through a second wireless communicator; and controlling the first wireless communicator to switch from a reception mode to receive the first audio signal from the first source apparatus to a transmission mode to transmit a second audio signal different from the first audio signal to an external speaker apparatus.

In accordance with an aspect of another exemplary embodiment, there is provided an electronic apparatus including: a wireless communicator connected with an external speaker apparatus and configured to transmit a first audio signal; and a controller configured to control the wireless communicator. The controller is configured to control the wireless communicator to switch from a transmission mode to transmit the first audio signal to the external speaker apparatus to a reception mode to receive a second audio signal from an external apparatus in response to wireless communicator receiving information representing that the external speaker apparatus switches into an external speaker apparatus transmission mode through the wireless communicator.

A speaker apparatus and a controlling method of the speaker apparatus of the present disclosure may automatically change transmission and reception modes of a wireless communication mode depending on a source apparatus connected to the speaker apparatus, thereby making it possible for a user to change a source apparatus freely.

Also, the speaker apparatus may detect transmission and reception modes of an external electronic apparatus to switch the transmission and reception modes of the wireless communication module, thereby making it possible to receive or transmit an audio signal stably.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and/or and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Below, various exemplary embodiments of the present disclosure will be described with reference to accompanying drawings. However, those of ordinary skill in the art will recognize that modification, equivalent, and/or alternative on the various exemplary embodiments described herein can be variously made without departing from the scope and spirit of the present invention. With regard to description of drawings, similar elements may be marked by similar reference numerals.

Figure 1:
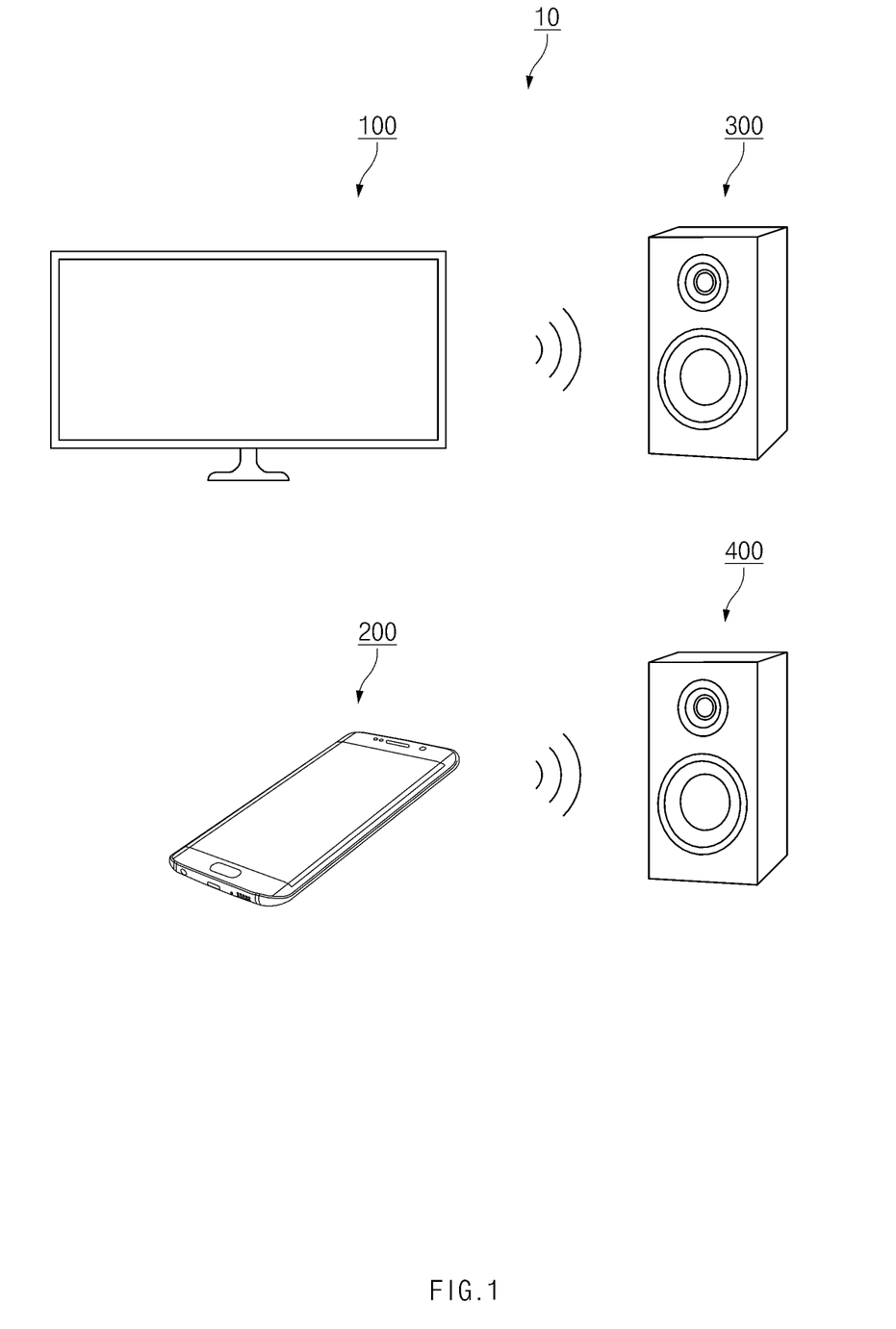
FIG. 1 is a view illustrating a speaker system according to an exemplary embodiment.

FIG. 1 is a view illustrating a speaker system 10 according to an exemplary embodiment.

Referring to FIG. 1, a speaker system 10 may include a first source apparatus 100, a second source apparatus 200, a first speaker apparatus 300, and a second speaker apparatus 400.

According to an exemplary embodiment, the first source apparatus 100 may be wirelessly connected to the first speaker apparatus 300 and the second speaker apparatus 400 to transmit an audio signal. For example, the first source apparatus 100 may be an apparatus that is capable of transmitting an audio signal to an external apparatus (e.g., a speaker apparatus) such as a TV, a desktop, a notebook PC, or a tablet PC. The first source apparatus 100 may transmit the audio signal received from the external apparatus or stored in an internal memory to the first speaker apparatus 300 and the second speaker apparatus 400.

According to an exemplary embodiment, the first source apparatus 100 may be wirelessly connected with the first speaker apparatus 300 and the second speaker apparatus 400. For example, the first source apparatus 100 may be wirelessly connected with the first speaker apparatus 300 and the second speaker apparatus 400 by using a Bluetooth, near field communication (NFC), wireless-fidelity (Wi-Fi), or Wi-Fi direct manner.

According to an exemplary embodiment, the first source apparatus 100 may be wirelessly connected with the first speaker apparatus 300 and the second speaker apparatus 400 through a wireless dongle including a wireless communication module. The wireless dongle may be connected to a wired communication module (e.g., a USB module) included in the first source apparatus 100, for example. The first source apparatus 100 may be connected to the first speaker apparatus 300 and the second speaker apparatus 400 through the wireless dongle connected to the wired communication module.

According to an exemplary embodiment, the second source apparatus 200 may be wirelessly connected to the second speaker apparatus 400 to transmit an audio signal. The second source apparatus 200 may transmit an audio signal to the first speaker apparatus 300 through the second speaker apparatus 400. The second source apparatus 200 may be, for example, a portable apparatus, which reproduces internal or external content, such as a mobile phone, a smartphone, or a tablet PC. The second source apparatus 200 may transmit an audio signal of the reproduced content to the second speaker apparatus 400.

According to an exemplary embodiment, the first speaker apparatus 300 may be wirelessly connected with the first source apparatus 100 or the second source apparatus 200 to transmit an audio signal.

According to an exemplary embodiment, the second speaker apparatus 400 may be wirelessly connected with the first source apparatus 100 or the second source apparatus 200 to transmit an audio signal. According to an exemplary embodiment, the second speaker apparatus 400 may be connected with the first speaker apparatus 300 to transmit an audio signal to the first speaker apparatus 300. For example, the second speaker apparatus 400 may transmit an audio signal received from the second source apparatus 200 to the first speaker apparatus 300 while being connected with the second source apparatus 200.

As illustrated in FIG. 1, the speaker system 10 may include a plurality of speakers (e.g., the first speaker apparatus 300 and the second speaker apparatus 400). The speaker system 10 may implement a stereophonic sound, such as a 2-channel sound, a 2.1-channel sound, a 4-channel sound, or a 5.1-channel sound, depending on the number of speakers. For example, the speaker system 10 may output a first channel audio signal (e.g., a right audio signal) through the first speaker apparatus 300 and may output a second channel audio signal (e.g., a left audio signal) through the second speaker apparatus 400.

According to an exemplary embodiment, the first source apparatus 100, the second source apparatus 200, the first speaker apparatus 300, and the second speaker apparatus 400 may be connected to each other through an access point (AP) or may be directly connected to each other in a peer-to-peer (P2P) manner. The connection between the first source apparatus 100, the second source apparatus 200, the first speaker apparatus 300, and the second speaker apparatus 400 may use, for example, a communication manner, such as Bluetooth, NFC, Wi-Fi, or Wi-Fi direct.

Figure 2:
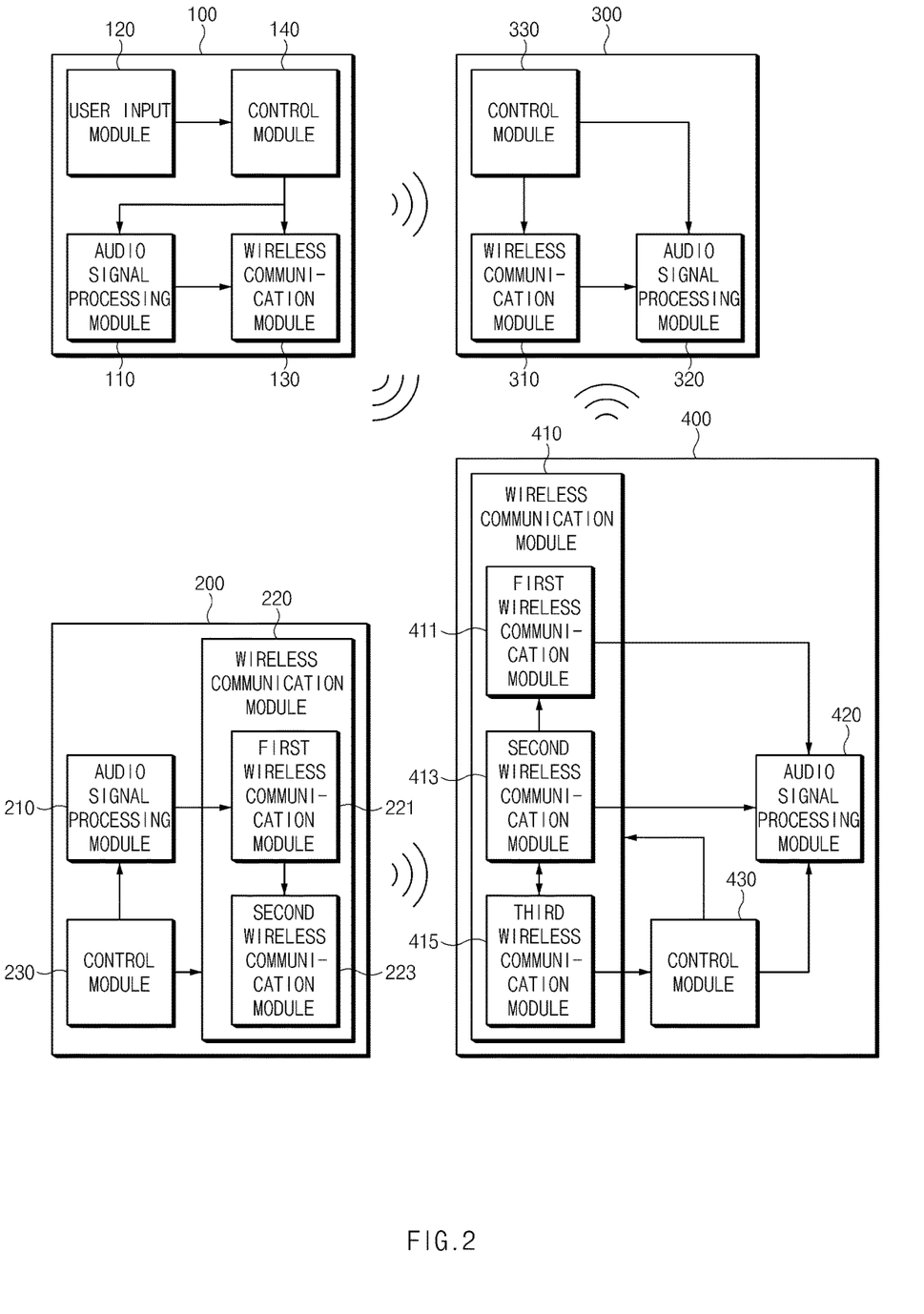
FIG. 2 is a block diagram illustrating a configuration of the speaker system according to an exemplary embodiment.

FIG. 2 is a block diagram illustrating a configuration of a speaker system 10 according to an exemplary embodiment.

Referring to FIG. 2, at least one of the first source apparatus 100 and the second source apparatus 200 may be wirelessly connected to the second speaker apparatus 400.

The first source apparatus 100 may include an audio signal processing module (or an audio signal processor) 110, a user input module (or a user input device) 120, a wireless communication module (or a wireless communicator) 130, a control module (or controller) 140.

The audio signal processing module 110 may decode an audio signal. For example, an audio signal of the first source apparatus 100 may include a bitstream. The audio signal processing module 110 decodes the bitstream depending on an audio format standard used in the input audio signal. The audio format standard may be, for example, MPEG-1 layer and MPEG-2 layer used in digital audio broadcasting (DAB), bit-sliced arithmetic coding (BSAC) used in VHF digital multimedia broadcasting (DMB), advanced audio coding (AAC) used in satellite DMB, audio code number 3 (AC-3) used in high definition television (HDTV) broadcasting, or the like.

The user input module 120 may receive a user input. For example, the user input module 120 may receive a user input for establishing a connection with the first speaker apparatus 300 and the second speaker apparatus 400. The wireless communication module 130 may be connected with the first speaker apparatus 300 and the second speaker apparatus 400 to transmit an audio signal. The wireless communication module 130 may transmit an audio signal decoded in the audio signal processing module 110 to the first speaker apparatus 300 and the second speaker apparatus 400. According to an exemplary embodiment, the wireless communication module 130 may include a Wi-Fi module. For example, the wireless communication module 130 may transmit the audio signal to the first speaker apparatus 300 and the second speaker apparatus 400 by using a Wi-Fi direct communication manner.

According to an exemplary embodiment, the wireless communication module 130 may include a transmission mode to transmit an audio signal and a reception mode to receive an audio signal. The transmission mode means a mode to transmit an audio signal, and the reception mode means a mode to receive an audio signal. According to an exemplary embodiment, in the case of any other signal except for an audio signal, the wireless communication module 130 may receive or transmit the other signal regardless of the transmission mode or the reception mode.

According to an exemplary embodiment, the wireless communication module 130 may include a transmission mode capable of transmitting an audio signal to an external apparatus and a reception mode capable of receiving an audio signal from the external apparatus in one communication module. For example, the wireless communication module 130 may store both firmware for the transmission mode and firmware for the reception mode and may change the firmware depending on a set mode to transmit or receive an audio signal.

The control module 140 may control overall operations of the first source apparatus 100. For example, the control module 140 may control the audio signal processing module 110 to decode an audio signal. The control module 140 may control the user input module 120 to receive a command of a user.

According to an exemplary embodiment, the control module 140 may control the wireless communication module 130 to switch between the transmission and reception modes. For example, the control module 140 may switch between the transmission and reception modes of the wireless communication module 130 depending on a connection state between the second source apparatus 200 and the second speaker apparatus 400. For another example, the control module 140 may switch the transmission and reception modes of the wireless communication module 130 depending on a user input received through the user input module 120. As such, the control module 140 may control the transmission and reception modes of the wireless communication module 130 to transmit an audio signal to the first speaker apparatus 300 and the second speaker apparatus 400 or to stop transmitting an audio signal.

The second source apparatus 200 may include an audio signal processing module (or an audio signal processor) 210, a wireless communication module (or a wireless communicator) 220, and a control module (or controller) 230.

The audio signal processing module 210 may be similar to the audio signal processing module 110 of the first source apparatus 100. For example, the audio signal processing module 210 may decode an audio signal of content stored in the second source apparatus 200 as well as an external apparatus.

The wireless communication module 220 may include a first wireless communication module 221 and a second wireless communication module 223.

The first wireless communication module 221 may be connected with the second speaker apparatus 400 to transmit an audio signal. According to an exemplary embodiment, the first wireless communication module 221 may include a communication module that is different from the wireless communication module 130 of the first source apparatus 100. For example, the first wireless communication module 221 may include a Bluetooth communication module. According to an exemplary embodiment, the first wireless communication module 221 may transmit an audio signal decoded in the audio signal processing module 210 to the second speaker apparatus 400.

According to an exemplary embodiment, the first wireless communication module 221 may be connected (e.g., paired) with the second speaker apparatus 400 by using information received from the second speaker apparatus 400 through the second wireless communication module 223.

According to an exemplary embodiment, the second wireless communication module 223 may transmit or receive information for establishing a connection with the second speaker apparatus 400 to or from the first wireless communication module 221. According to an exemplary embodiment, the second wireless communication module 223 may include an NFC communication module. The second wireless communication module 223 may be connected with the second speaker apparatus 400 if the second source apparatus 200 is tagged with the second speaker apparatus 400. Through the connection, the second wireless communication module 223 may transmit or receive information for establishing a connection with the second speaker apparatus 400 to or from the first wireless communication module 221.

The control module 230 may control overall operations of the second source apparatus 200. For example, the control module 230 may control the audio signal processing module 210 to decode an audio signal. The control module 230 may control the wireless communication module 220 to transmit an audio signal to the second speaker apparatus 400.

The first speaker apparatus 300 may include a wireless communication module (or an wireless communicator) 310, an audio signal processing module (or an audio signal processor) 320, and a control module (or a controller) 330.

The wireless communication module 310 may be connected with the first source apparatus 100 or the second speaker apparatus 400 to receive an audio signal from the first source apparatus 100 or the second speaker apparatus 400. For example, the wireless communication module 310 may be connected with the first source apparatus 100 or the second speaker apparatus 400 by using the Wi-Fi direct communication manner. The wireless communication module 310 may be connected with the first source apparatus 100 or the second speaker apparatus 400 in the P2P manner (e.g., Wi-Fi direct).

The audio signal processing module 320 may convert an audio signal received from the first source apparatus 100 or the second speaker apparatus 400 to an analog signal and may amplify the converted signal. For example, the audio signal processing module 320 may include a digital-to-analog converter (DAC) module and an amplifier (AMP) module. The DAC module may convert a received audio signal to an analog audio signal. The AMP module may amplify the analog audio signal. Accordingly, the first speaker apparatus 300 may output the amplified audio signal. However, exemplary embodiments of the present disclosure may not be limited thereto. For example, the DAC module or the AMP module may be omitted.

The control module 330 may control overall operations of the first speaker apparatus 300. For example, the control module 330 may control the wireless communication module 310 to receive an audio signal from the first source apparatus 100 or the second speaker apparatus 400. The control module 330 may control the audio signal processing module 320 to output an audio signal received from the first source apparatus 100 or the second speaker apparatus 400.

The second speaker apparatus 400 may include a wireless communication module (or a wireless communicator) 410, an audio signal processing module (or an audio signal processor) 420, and a control module (or a controller) 430.

The wireless communication module 410 may include a first wireless communication module (or a first wireless communicator) 411, a second wireless communication module (or a second wireless communicator) 413, and a third wireless communication module (or a third wireless communicator) 415.

The first wireless communication module 411 may be connected with the first source apparatus 100 to receive an audio signal from the first source apparatus 100. The first wireless communication module 411 may include a Wi-Fi module. For example, the first wireless communication module 411 may be connected with the first source apparatus 100 by using the Wi-Fi communication manner. The first wireless communication module 411 may be connected with the first source apparatus 100 in the P2P manner (e.g., Wi-Fi direct).

According to an exemplary embodiment, the first wireless communication module 411 may be connected with the first speaker apparatus 300 to transmit an audio signal to the first speaker apparatus 300. For example, the first wireless communication module 411 may transmit an audio signal received from the second source apparatus 200 through the second wireless communication module 413 to the first speaker apparatus 300. The first wireless communication module 411 may be connected with the first speaker apparatus 300 by using the Wi-Fi communication manner. The first wireless communication module 411 may be connected with the first source apparatus 100 in the P2P manner (e.g., Wi-Fi direct).

According to an exemplary embodiment, the first wireless communication module 411 may include a transmission mode to transmit an audio signal and a reception mode to receive an audio signal. The transmission mode means a state of transmitting an audio signal, and the reception mode means a state of receiving an audio signal. The first wireless communication module 411 may receive any other signal except for an audio signal in the transmission mode or may transmit any other signal except for an audio signal in the reception mode.

According to an exemplary embodiment, the first wireless communication module 411 may include a transmission mode capable of transmitting an audio signal to an external apparatus and a reception mode capable of receiving an audio signal from an external apparatus in one communication module. For example, the first wireless communication module 411 may store both firmware for the transmission mode and firmware for the reception mode and may change the firmware depending on a mode to transmit or receive an audio signal.

The second wireless communication module 413 may be connected with the second source apparatus 200 to receive the audio signal from the second source apparatus 200. According to an exemplary embodiment, the second wireless communication module 413 may include a Bluetooth module. For example, the second wireless communication module 413 may be connected with the second source apparatus 200 by using the Bluetooth communication manner. The second wireless communication module 413 may be connected with the second source apparatus 200 in the P2P manner.

According to an exemplary embodiment, the second wireless communication module 413 may be connected (e.g., paired) with the second source apparatus 200 by using information received from the second source apparatus 200 through the third wireless communication module 415. According to an exemplary embodiment, the third wireless communication module 415 may transmit or receive information for establishing a connection with the second source apparatus 200 to or from the second wireless communication module 413. According to an exemplary embodiment, the third wireless communication module 415 may include an NFC communication module. The third wireless communication module 415 may be connected with the second source apparatus 200 if the second source apparatus 200 is tagged to the second speaker apparatus 400. Through the connection, the third wireless communication module 415 may transmit or receive information for establishing a connection with the second source apparatus 200 to or from the second wireless communication module 413.

The audio signal processing module 420 may be similar to the audio signal processing module 320 of the first speaker apparatus 300. For example, the audio signal processing module 420 may convert an audio signal received from the first source apparatus 100 or the second source apparatus 200 to an analog signal and may amplify the converted signal.

The control module 430 may control overall operations of the second speaker apparatus 400. For example, the control module 430 may control the wireless communication module 410 to receive an audio signal from the first source apparatus 100 or the second source apparatus 200 and to transmit the audio signal to the first speaker apparatus 300. The control module 430 may control the audio signal processing module 420 to output an audio signal received from the first source apparatus 100 or the second source apparatus 200.

According to an exemplary embodiment, the control module 430 may control the first wireless communication module 411 to switch the transmission and reception modes. For example, the control module 430 may switch the transmission and reception modes of the first wireless communication module 411 depending on a connection state between the second wireless communication module 413 and the second source apparatus 200. As such, the control module 430 may control the transmission and reception modes of the first wireless communication module 411 to receive an audio signal from the first source apparatus 100 or to transmit an audio signal to the first speaker apparatus 300.

According to an exemplary embodiment, the control module 430 may include one or more processors. For example, the processor may be implemented with a system on chip (SoC) that includes a central processing unit (CPU), a graphics processing unit (GPU), a memory, and the like.

Figure 3:
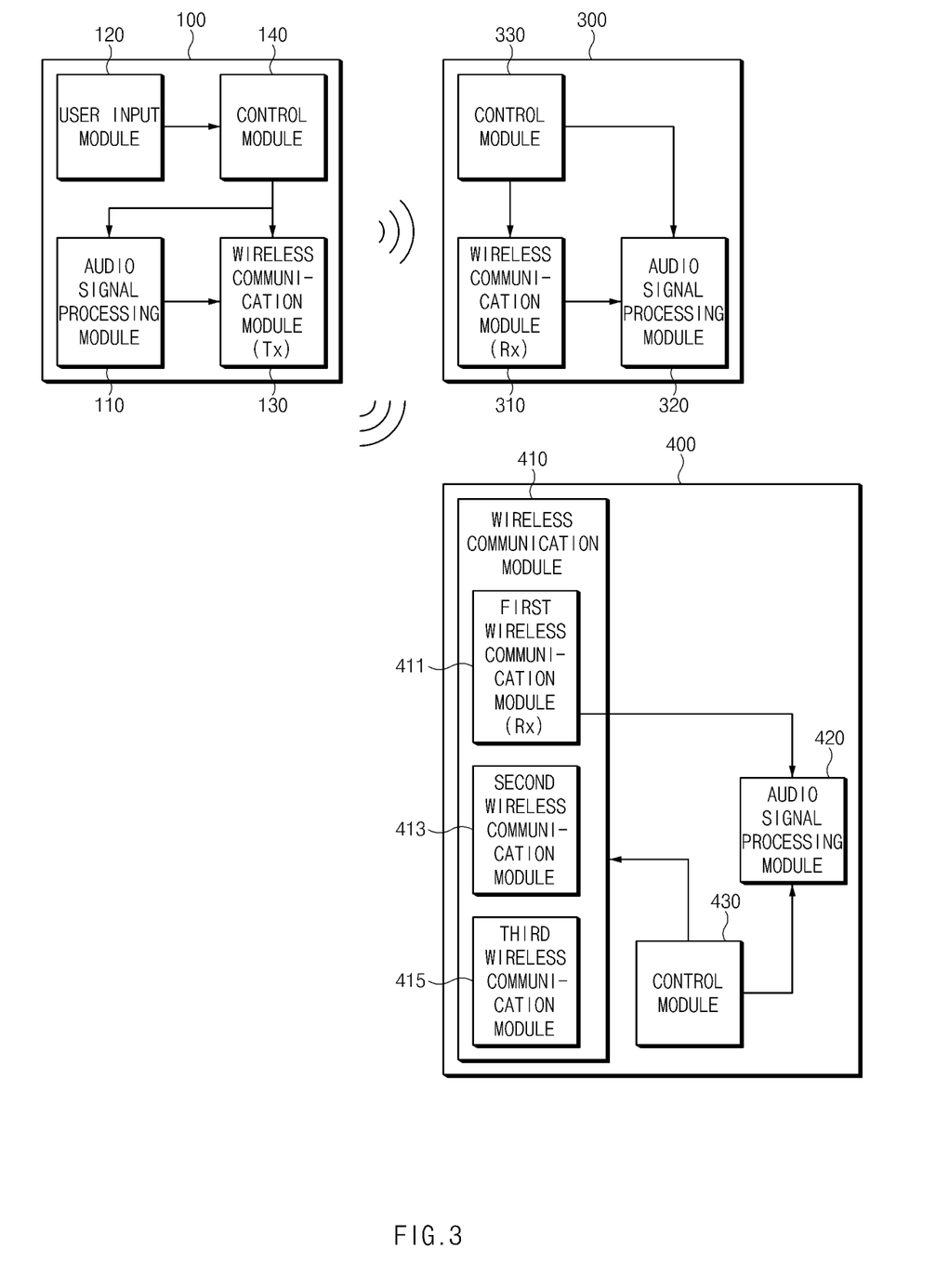
FIG. 3 is a view illustrating a state in which a second speaker apparatus receives an audio signal from a first source apparatus according to an exemplary embodiment.

FIG. 3 is a view illustrating a state in which a second speaker apparatus 400 receives an audio signal from a first source apparatus 100 according to an exemplary embodiment.

Referring to FIG. 3, the first source apparatus 100 may be connected to the first speaker apparatus 300 and the second speaker apparatus 400, and the first speaker apparatus 300 and the second speaker apparatus 400 may receive an audio signal from the first source apparatus 100.

According to an exemplary embodiment, the control module 140 of the first source apparatus 100 may allow the wireless communication module 130 to operate in a transmission mode Tx in a state where the wireless communication module 130 is connected with the first speaker apparatus 300 and the second speaker apparatus 400. As such, the first source apparatus 100 may transmit an audio signal to the first speaker apparatus 300 and the second speaker apparatus 400 through the wireless communication module 130. According to an exemplary embodiment, the first speaker apparatus 300 may receive an audio signal from the first source apparatus 100 through the wireless communication module 310. The wireless communication module 310 of the first speaker apparatus 300 may be in a reception mode Rx. According to an exemplary embodiment, the first speaker apparatus 300 may convert the received audio signal to an analog signal through the audio signal processing module 320 and may output the converted signal.

According to an exemplary embodiment, the control module 430 of the second speaker apparatus 400 may allow the first wireless communication module 411 to operate in the reception mode Rx in a state where the first wireless communication module 411 is connected with the first source apparatus 100. As such, the second speaker apparatus 400 may receive an audio signal from the first source apparatus 100 through the first wireless communication module 411. According to an exemplary embodiment, the second speaker apparatus 400 may convert the received audio signal to an analog signal through the audio signal processing module 420 and may output the converted signal.

Accordingly, the first speaker apparatus 300 and the second speaker apparatus 400 may output the audio signal received from the first source apparatus 100.

Figure 4:
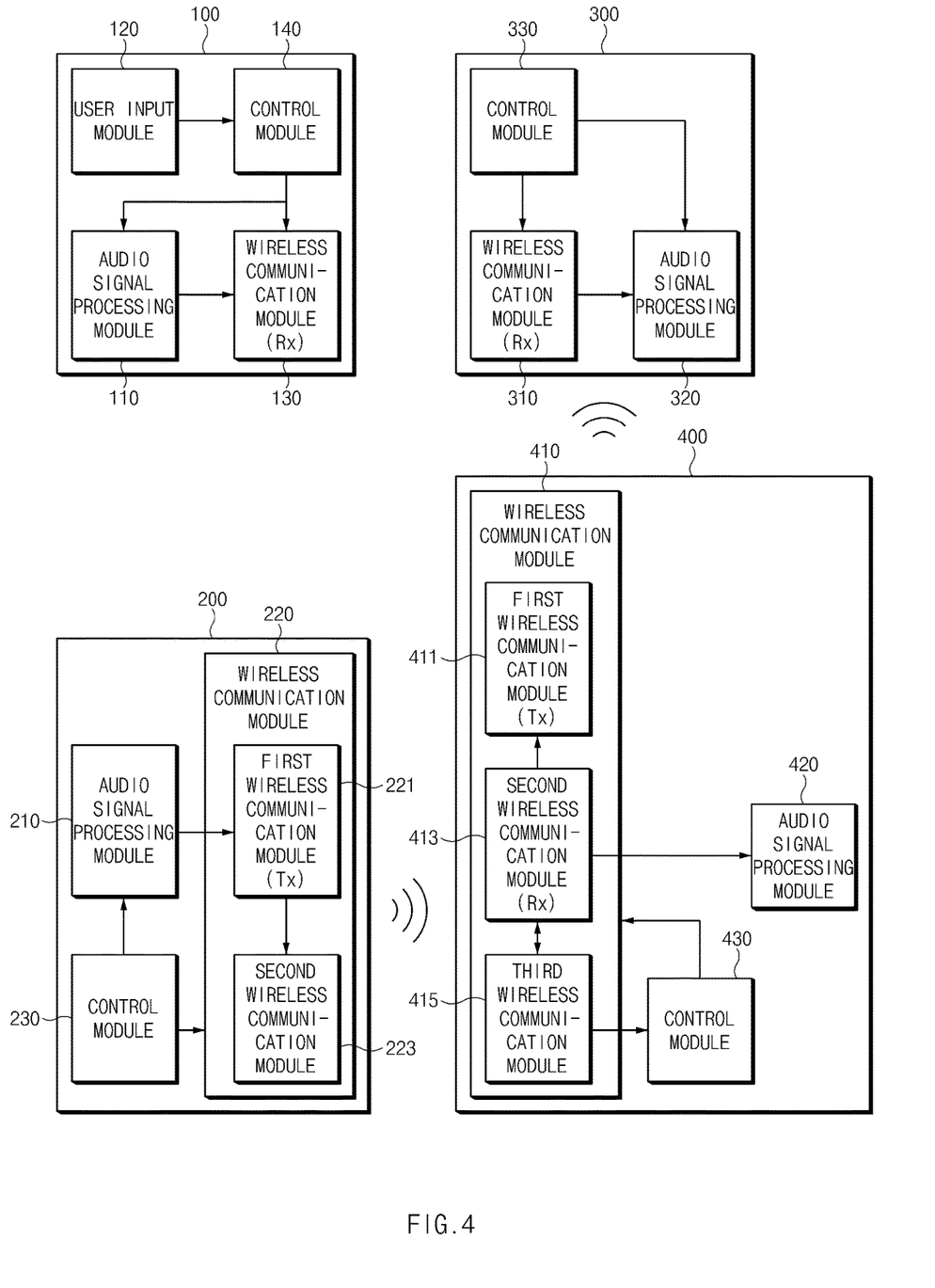
FIG. 4 is a view illustrating a state in which the second speaker apparatus receives an audio signal from the second source apparatus according to an exemplary embodiment.

FIG. 4 is a view illustrating a state in which a second speaker apparatus 400 receives an audio signal from a second source apparatus 200 according to an exemplary embodiment.

Referring to FIG. 4, the second source apparatus 200 may be connected with the second speaker apparatus 400. Through the connection, the second speaker apparatus 400 may receive an audio signal from the second source apparatus 200 and may transmit an audio signal to the first speaker apparatus 300.

According to an exemplary embodiment, the second source apparatus 200 may be tagged to the second speaker apparatus 400. For example, a user of the second source apparatus 200 may tag the second source apparatus 200 to the second speaker apparatus 400 for the purpose of connecting the second source apparatus 200 to the second speaker apparatus 400. According to an exemplary embodiment, if the second source apparatus 200 is tagged to the second speaker apparatus 400, the second wireless communication module 223 of the second source apparatus 200 and the third wireless communication module 415 of the second speaker apparatus 400 may be connected to each other, thereby making it possible to transmit and receive information for establishing a connection with the first wireless communication module 221 of the second source apparatus 200 to and from the second wireless communication module 413 of the second speaker apparatus 400. According to an exemplary embodiment, the first wireless communication module 221 of the second source apparatus 200 and the second wireless communication module 413 of the second speaker apparatus 400 may be connected to each other (or may be paired with each other) by using the transmitted and received information.

According to an exemplary embodiment, the second source apparatus 200 may transmit an audio signal through the first wireless communication module 221, and the second speaker apparatus 400 may receive the audio signal through the second wireless communication module 413. The first wireless communication module 221 of the second source apparatus 200 may be in the transmission mode Tx, and the second wireless communication module 413 of the second speaker apparatus 400 may be in the reception mode Rx.

According to an exemplary embodiment, if the second wireless communication module 413 is connected with the second source apparatus 200, the control module 430 of the second speaker apparatus 400 may allow the first wireless communication module 411 to switch from the reception mode Rx to the transmission mode Tx.

According to an exemplary embodiment, if the second speaker apparatus 400 is connected with the second source apparatus 200 through the second wireless communication module 413, the second speaker apparatus 400 may transmit an audio signal received from the second source apparatus 200 to the first speaker apparatus 300 through the first wireless communication module 411. According to an exemplary embodiment, the speaker apparatus 400 may convert the received audio signal to an analog signal through the audio signal processing module 420 and may output the converted signal. According to an exemplary embodiment, if the second wireless communication module 413 is connected with the second source apparatus 200, the control module 430 of the second speaker apparatus 400 may transmit information about connection with the second source apparatus 200 (e.g., information representing that connection with the second source apparatus 200 is established through the second wireless communication module 413) to the first source apparatus 100 through the first wireless communication module 411.

According to an exemplary embodiment, the first source apparatus 100 may detect that the first wireless communication module 411 of the second speaker apparatus 400 switches into the transmission mode Tx, through the wireless communication module 130. In this case, the first source apparatus 100 may allow the wireless communication module 130 to switch from the transmission mode Tx to the reception mode Rx.

According to an exemplary embodiment, if the wireless communication module 130 switches from the transmission mode Tx to the reception mode Rx, the first source apparatus 100 may transmit information indicating that the first source apparatus 100 has switched from the transmission mode Tx into the reception mode Rx, to the second speaker apparatus 400 through the wireless communication module 130.

According to an exemplary embodiment, if the information indicating that the first source apparatus 100 has switched from the transmission mode Tx into the reception mode Rx is received from the wireless communication module 130 through the first wireless communication module 411, the control module 430 of the second speaker apparatus 400 may detect that the first source apparatus 100 has switched into the reception mode Rx. According to an exemplary embodiment, if the information indicating that the first source apparatus 100 has switched into the reception mode Rx is received, the control module 430 of the second speaker apparatus 400 may transmit an audio signal received from the second source apparatus 200 to the first speaker apparatus 300 through the first wireless communication module 411. According to an exemplary embodiment, the second speaker apparatus 400 may convert the received audio signal to a signal, which a speaker is able to output, through the audio signal processing module 420 and may output the converted signal.

According to an exemplary embodiment, the first speaker apparatus 300 may receive an audio signal from the second speaker apparatus 400 through the wireless communication module 310.

According to an exemplary embodiment, the first speaker apparatus 300 may convert the received audio signal from the second speaker apparatus 400 to an analog signal through the audio signal processing module 320 and may output the converted signal.

Accordingly, the first speaker apparatus 300 and the second speaker apparatus 400 may output the audio signal received from the second source apparatus 200. As the first source apparatus 100 switches from the transmission mode Tx to the reception mode Rx, the first speaker apparatus 300 may stably receive an audio signal.

Figure 5:
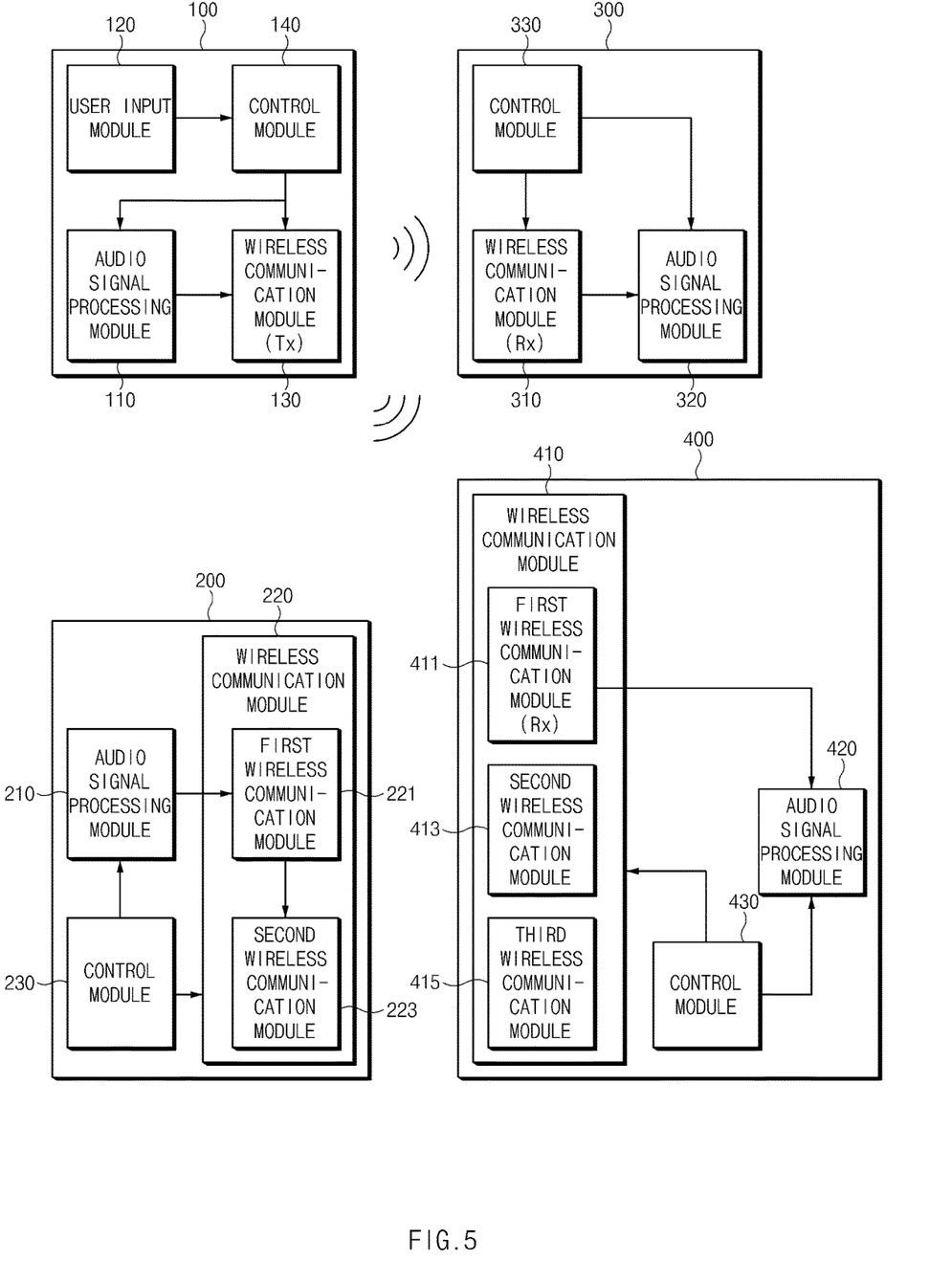
FIG. 5 is a view illustrating a state in which the second speaker apparatus again receives an audio signal from the first source apparatus according to an exemplary embodiment.

FIG. 5 is a view illustrating a state in which a second speaker apparatus 400 again receives an audio signal from a first source apparatus 100 according to an exemplary embodiment.

Referring to FIG. 5, connection of the second source apparatus 200 and the second speaker apparatus 400 is released, and the first speaker apparatus 300 and the second speaker apparatus 400 may receive an audio signal from the first source apparatus 100.

According to an exemplary embodiment, the first source apparatus 100 may receive a user input for establishing a connection with the first speaker apparatus 300 and the second speaker apparatus 400 through the user input module 120.

According to an exemplary embodiment, if the first source apparatus 100 receives the user input for establishing connection with the first speaker apparatus 300 and the second speaker apparatus 400, the control module 140 of the first source apparatus 100 may allow the wireless communication module 130 to switch from the reception mode Rx to the transmission mode Tx. Accordingly, the first source apparatus 100 may transmit an audio signal to the first speaker apparatus 300 and the second speaker apparatus 400.

According to an exemplary embodiment, if a user input for establishing a connection with the first speaker apparatus 300 and the second speaker apparatus 400 is received through the user input module 120, the first source apparatus 100 may transmit a connection request (or connection request information) for establishing a connection with the first speaker apparatus 300 and the second speaker apparatus 400 to the first speaker apparatus 300 and the second speaker apparatus 400.

According to an exemplary embodiment, if the second speaker apparatus 400 receives the connection request (or the connection request information) for establishing a connection with the first speaker apparatus 300 and the second speaker apparatus 400 from the first source apparatus 100, the second speaker apparatus 400 may allow the first wireless communication module 411 to switch from the transmission mode Tx to the reception mode Rx. According to an exemplary embodiment, the second speaker apparatus 400 may receive the audio signal from the first source apparatus 100 through the first wireless communication module 411. Accordingly, the second speaker apparatus 400 may convert the received audio signal to an analog signal or a signal suitable for speaker output through the audio signal processing module 420 and may output the converted signal.

According to an exemplary embodiment, the second source apparatus 200 may release the connection with the second speaker apparatus 400. For example, if the second speaker apparatus 400 receives a connection request (or connection request information) through the first wireless communication module 411 from the first source apparatus 100, the second speaker apparatus 400 may release the connection with the first source apparatus 100. For example, if the first source apparatus 100 receives a user input for establishing a connection with the first speaker apparatus 300 and the second speaker apparatus 400 through the user input module 120, the first source apparatus 100 may transmit the connection request (or the connection request information) to the second speaker apparatus 400. For another example, if the first wireless communication module 221 of the second source apparatus 200 or the second wireless communication module 413 of the second speaker apparatus 400 is deactivated, the second source apparatus 200 may release the connection with the second speaker apparatus 400. For another example, if the second source apparatus 200 and the second speaker apparatus 400 are out of an allowable communication range, the second source apparatus 200 may release the connection with the second speaker apparatus 400.

According to an exemplary embodiment, if the second wireless communication module 413 is disconnected from the second source apparatus 200, the control module 430 of the second speaker apparatus 400 may allow the first wireless communication module 411 to switch from the transmission mode Tx to the reception mode Rx.

According to an exemplary embodiment, if the second wireless communication module 413 is disconnected from the second source apparatus 200, the second speaker apparatus 400 may transmit information about disconnection from the second source apparatus 200 (or information representing that the second speaker apparatus 400 switches into a reception mode) to the first source apparatus 100.

According to an exemplary embodiment, if the information about disconnection from the second source apparatus 200 is received through the wireless communication module 130, the first source apparatus 100 may detect that the first wireless communication module 411 of the second speaker apparatus 400 switches from the transmission mode Tx into the reception mode Rx. According to an exemplary embodiment, if the disconnection information is received, the control module 140 of the source apparatus 100 may allow the wireless communication module 130 to switch from the reception mode Rx to the transmission mode Tx. As such, the first source apparatus 100 may transmit an audio signal to the first speaker apparatus 300 and the second speaker apparatus 400 through the wireless communication module 130.

With the above-described arrangement, the first source apparatus 100, the first speaker apparatus 300, and the second speaker apparatus 400 may be connected to be similar to the first source apparatus 100, the first speaker apparatus 300, and the second speaker apparatus 400 of FIG. 3.

According to various exemplary embodiments of the present disclosure, the second speaker apparatus 400 may automatically switch between transmission and reception modes of the wireless communication module 410 depending on the source apparatuses 100 and 200 connected to the second speaker apparatus 400, thereby making it possible for a user to change the source apparatuses 100 and 200 freely.

Also, the second speaker apparatus 400 may detect transmission and reception modes of an external electronic apparatus to switch the transmission and reception modes of the first wireless communication module 411, thereby making it possible to receive or transmit an audio signal stably.

Figure 6:
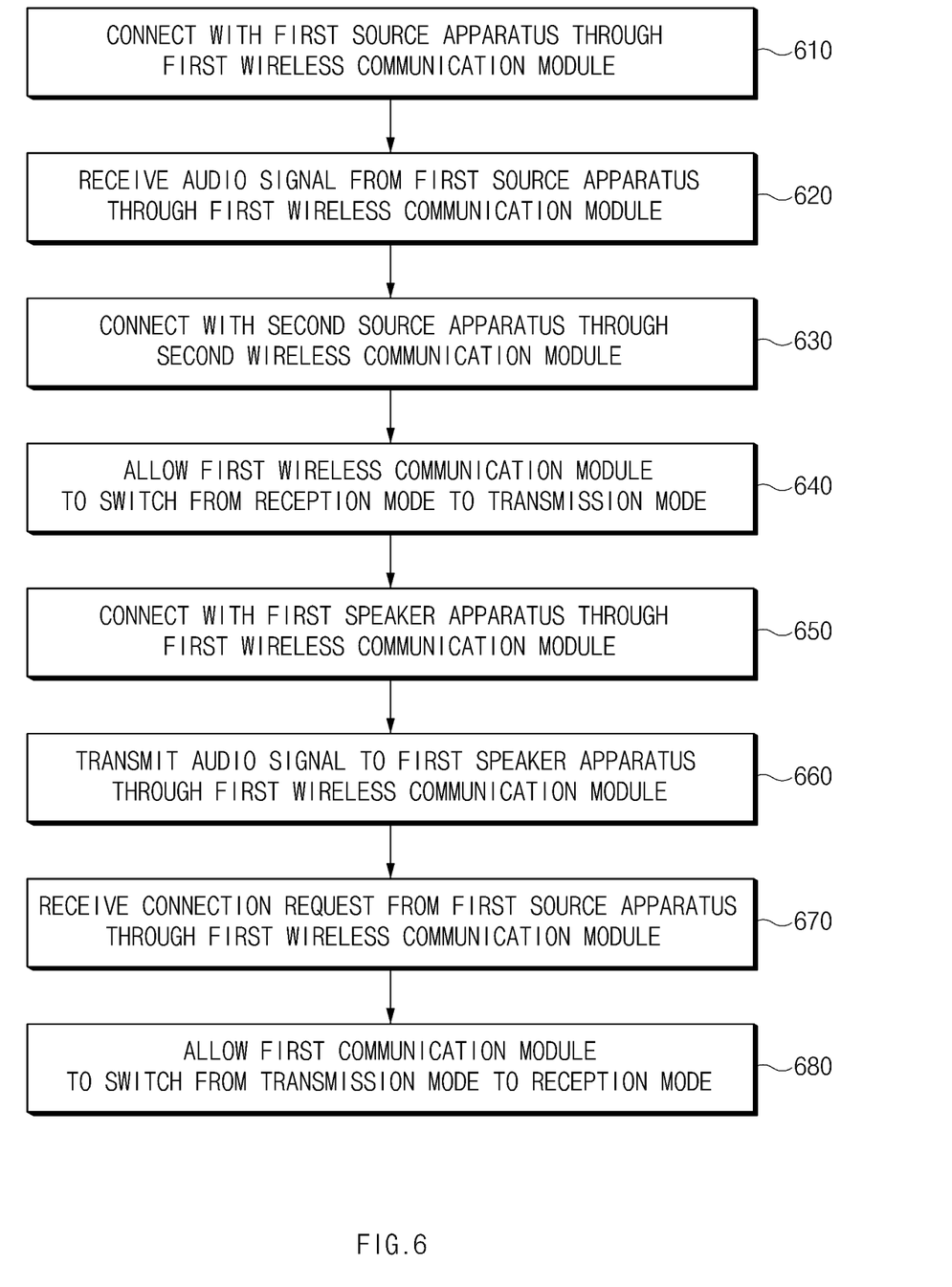
FIG. 6 is a flowchart illustrating a controlling method of the second speaker apparatus according to various exemplary embodiments.

FIG. 6 is a flowchart illustrating a controlling method of a second speaker apparatus according to various exemplary embodiments of the present disclosure.

The flowchart illustrated in FIG. 6 may include operations that the first speaker apparatus 300 and the second speaker apparatus 400 described above process. Accordingly, even though omitted below, a description of the first speaker apparatus 300 and the second speaker apparatus 400 given with reference to FIG. 5 may be applied to the flowchart illustrated in FIG. 6.

According to an exemplary embodiment, in operation 610, the second speaker apparatus 400 may be connected with the first source apparatus 100 through the first wireless communication module 411. The first wireless communication module 411 of the second speaker apparatus 400 may be connected with the wireless communication module 130 of the first source apparatus 100.

According to an exemplary embodiment, in operation 620, the second speaker apparatus 400 may receive an audio signal from the first source apparatus 100 through the first wireless communication module 411.

According to an exemplary embodiment, in operation 630, the second speaker apparatus 400 may connect with the second source apparatus 200 through the second wireless communication module 413. The second wireless communication module 413 of the second speaker apparatus 400 may be connected with the first wireless communication module 231 of the second source apparatus 200. The second speaker apparatus 400 may receive an audio signal from the second source apparatus 200 through the second wireless communication module 413.

According to an exemplary embodiment, in operation 640, the second speaker apparatus 400 may allow the first wireless communication module 411 to switch from a reception mode to a transmission mode. The second speaker apparatus 400 may receive the audio signal received from the second source apparatus 200 to the first speaker apparatus 300 through the first wireless communication module 411.

According to an exemplary embodiment, in operation 650, the second speaker apparatus 400 may be connected with the first speaker apparatus 300 through the first wireless communication module 411. The first wireless communication module 411 of the second speaker apparatus 400 may be connected with the wireless communication module 310 of the first speaker apparatus 300.

According to an exemplary embodiment, in operation 660, the second speaker apparatus 400 may transmit an audio signal to the first speaker apparatus 300 through the first wireless communication module 411.

According to an exemplary embodiment, in operation 670, the connection of the second wireless communication module 413 of the second speaker apparatus 400 and the second source apparatus 200 may be released. The connection of the second wireless communication module 413 of the second speaker apparatus 400 and the first wireless communication module 221 of the second source apparatus 200 may be released.

According to an exemplary embodiment, in operation 680, the second speaker apparatus 400 may allow the first wireless communication module 411 to switch from the transmission mode to the reception mode. The second speaker apparatus 400 may receive the audio signal from the first source apparatus 100 through the first wireless communication module 411.

At least one of the components, elements, modules or units represented by a block as illustrated in FIGS. 2-5 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

In addition, the above-described operations or exemplary embodiments are examples which are not intended to limit the scope and spirit of the inventive concept. In the present disclosure, descriptions of known electric components, control systems, software, and other functional aspects thereof may not be given for conciseness. Furthermore, in the drawings, connection lines or members between elements are functional, physical, and/or electric connections that may be replaced with or used together with other functional, physical, and/or electrical connections. Elements described without using terms such as "essential" and "important" may not be necessary for constituting the inventive concept. That is, the scope of the inventive concept is not limited to the exemplary embodiments but should be defined by the appended claims and equivalents thereof.

While exemplary embodiments have been shown and described with reference to the figures, it will be understood by those skilled in the art that various changes in form and details may be made therein without departing from the spirit and scope of the present disclosure as defined by the appended claims and their equivalents.

What is claimed is:

1. A speaker system comprising:
an electronic apparatus; and
an external speaker apparatus,
wherein the external speaker apparatus comprises a first wireless communicator, a second wireless communicator and a third wireless communicator,
wherein the electronic apparatus comprises:
a first wireless communicator;
a second wireless communicator;
an audio processor; and
a controller configured to control the audio processor to process an audio signal and control each of the first wireless communicator and the second wireless communicator of the electronic apparatus to connect with the external speaker apparatus;
wherein the controller is further configured to:
in response to the second wireless communicator of the electronic apparatus being connected with the third wireless communicator of the external speaker apparatus, transmit, via the second wireless communicator of the electronic apparatus, connection information to the third wireless communicator of the external speaker apparatus, and
control the first wireless communicator of the electronic apparatus to transmit the processed audio signal to the second wireless communicator of the external speaker apparatus,
wherein the external speaker apparatus is configured to, based on the connection information being received from the electronic apparatus, switch a mode of the external speaker apparatus from a reception mode for receiving an audio signal of a source device to a transmission mode for transmitting the processed audio signal to another speaker apparatus, the source device being different from the electronic apparatus,
wherein the first wireless communicator of the external speaker apparatus comprises a Wi-Fi (wireless fidelity) module,
wherein each of the first wireless communicator of the electronic apparatus and the second wireless communicator of the external speaker apparatus comprises a Bluetooth module, and
wherein each of the second wireless communicator of the electronic apparatus and the third wireless communicator of the external speaker apparatus comprises a NFC (near field communication) module.

2. The speaker system of claim 1, wherein the controller is further configured to:
in response to a tag with the external speaker apparatus, control the second wireless communicator of the electronic apparatus to connect with the third wireless communicator of the external speaker apparatus.

3. The speaker system of claim 1, wherein the controller controls the connection to be released when the first wireless communicator of the electronic apparatus is deactivated.

4. The speaker system of claim 1, wherein the controller controls the connection to be released when the electronic apparatus and the external speaker apparatus are out of an allowable communication range.

5. A method of controlling a speaker system comprising an electronic apparatus and an external speaker apparatus, the electronic apparatus comprising a first wireless communicator and a second wireless communicator, and the external speaker apparatus comprising a first wireless communicator, a second wireless communicator and a third wireless communicator, the method comprising:
processing, by the electronic apparatus, an audio signal;
connecting with the external speaker apparatus by the electronic apparatus;
transmitting, by the electronic apparatus, via the second wireless communicator of the electronic apparatus, connection information to the third wireless communicator of the external speaker apparatus;
transmitting, by the electronic apparatus, via the first wireless communicator of the electronic apparatus, the processed audio signal to the second wireless communicator of the external speaker apparatus; and
based on the connection information being received from the electronic apparatus, switching, by the external speaker apparatus, a mode of the external speaker apparatus from a reception mode for receiving an audio signal of a source device to a transmission mode for transmitting the processed audio signal to another external speaker apparatus, the source device being different from the electronic apparatus,
wherein the first wireless communicator of the external speaker apparatus comprises a Wi-Fi (wireless fidelity) module,
wherein each of the first wireless communicator of the electronic apparatus and the second wireless communicator of the external speaker apparatus comprises a Bluetooth module, and
wherein each of the second wireless communicator of the electronic apparatus and the third wireless communicator of the external speaker apparatus comprises a NFC (near field communication) module.

6. The method of claim 5, the connecting with the external speaker apparatus comprising:
in response to a tag with the external speaker apparatus, controlling the second wireless communicator of the electronic apparatus to connect with the third wireless communicator of the external speaker apparatus.

7. The method of claim 6, wherein the method further comprises:
releasing the connection when the first wireless communicator of the electronic apparatus is deactivated.

8. The method of claim 5, wherein the method further comprises:
releasing the connection when the electronic apparatus and the external speaker apparatus are out of an allowable communication range.

* * * * *